United States Patent

[11] 3,632,459

[72] Inventor  Richard Klauer
           Wiesbaden-Erbenheim, Germany
[21] Appl. No. 871,419
[22] Filed  Oct. 24, 1969
[45] Patented Jan. 4, 1972
[73] Assignee Glyco-Metall-Werke Daelen & Loos GmbH
           Wiesbaden-Schierstein, Germany
           Continuation-in-part of application Ser. No.
           571,376, July 21, 1966, now abandoned.
           This application Oct. 24, 1969, Ser. No.
           871,419

[54] PROCESS FOR THE MANUFACTURE OF SLIDE BEARINGS, IN PARTICULAR COMPOUND BEARINGS
    3 Claims, 3 Drawing Figs.
[52] U.S. Cl. ................................................... 156/3,
           156/7, 156/250, 161/162, 161/189, 264/118,
           264/158, 308/238

[51] Int. Cl. ............................................... B32b 31/20,
                                                          C23f 1/00
[50] Field of Search ..................................... 308/238;
           156/3, 7, 18, 307, 308, 250; 161/189, 162;
           264/109, 111, 128, 127, 118, 158

[56]                    References Cited
                    UNITED STATES PATENTS
3,056,709  10/1962  Rising et al. ...................  156/7
3,342,667   9/1967  Berlinghof .....................  161/186

Primary Examiner—William A. Powell
Attorney—H. Gibner Lehmann

ABSTRACT: A sliding friction-type bearing, and a process for manufacturing the same by mixing metal and Teflon particles and compressing the same into a block, peeling a foil from the block, etching out the metal from the surface of the foil, impregnating one side of the foil with adhesive, and bonding the foil to a metal back under heat and pressure.

PROCESS FOR THE MANUFACTURE OF SLIDE BEARINGS, IN PARTICULAR COMPOUND BEARINGS

The present application is a continuation-in-part of my copending application, Ser. No. 571,376, filed July 21, 1966, now abandoned and entitled "Process for the Manufacture of Slide Bearings, in Particular Compound Bearings."

CROSS-REFERENCES TO RELATED APPLICATIONS

1. Copending application of Richard Klauer, Ser. No. 571,376, filed July 21, 1966, entitled "Process for the Manufacture of Slide Bearings, in Particular Compound Bearings," and having common ownership with the present application.

This invention relates to a sliding-friction type bearing and to a process for the manufacture of slide bearings, in particular compound bearings, having a bearing layer of metal filled with synthetic resin.

The invention is based on a known process for the manufacture of the above-mentioned slide bearings according to which metal powder of a suitable particle size and synthetic resin powder or granulate, in particular of polytetrafluorethylene of about the same particle size, are mixed together and worked up or compressed into a solid block in which the synthetic resin intimately encloses the metal granules. A thin strip or foil of substantially uniform thickness is then peeled or sliced off this block, said foil forming the bearing layer of the bearing. As is well known, the good sliding properties of polytetrafluoroethylene are due to the fact that it has no tendency to combine with steel.

Combining this foil with the steel back of the bearing gives rise to particular difficulties and renders the known process difficult, time-consuming and costly.

It is therefore highly desirable to find ways and means of simplifying and improving the combining of a synthetic resin foil with a metal surface, and it is the special task of the invention to provide an improved bearing of this type and also a process with which a bearing layer containing metal powder uniformly distributed in it, which layer is initially made as a foil, can be combined with the back of the bearing more simply and surely than hitherto.

According to the invention, this is achieved by providing a closed surface of synthetic resin which has been pretreated to improve its uptake of adhesive and which is to be adhered to and combined with the back of the bearing. It is therefore proposed according to the invention that after the foil has been cut off the block, those of the metal granules which have been cut or exposed are dissolved out at least on that surface of the foil which is to be attached to the back of the bearing. This dissolving out of the granules can be effected by means of acid or alkali to which the sides of the foil or strip are exposed, depending on the type of metal powder used. A special advantage of the porous foil surface produced in this way is that it has a pitting corresponding to the grain of the metal, which pitting helps to ensure secure attachment to the back of the bearing because the adhesive or the like can fill the voids and become anchored in them particularly effectively.

One embodiment of the invention will be explained more fully below with reference to the drawing.

Figure 1:
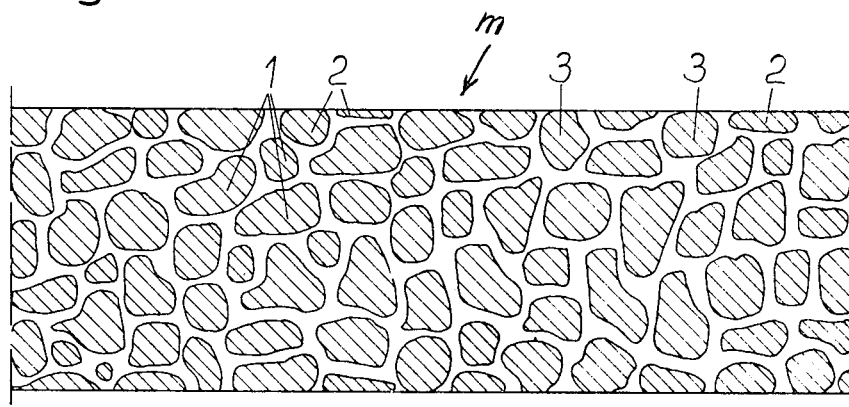
FIG. 1 is a section taken out of the greatly magnified cross section of a known cut foil of polytetrafluorethylene filled with metal powder.

The foil or strip (hereinafter also termed a "bearing member") designated generally by the letter "m" (FIG. 1) manufactured by the known process mentioned above (French Pat. specification No. 1,303,584) substantially contains the metal granules 1 enclosed by the synthetic resin, in particular tetrafluorethylene. On both surfaces of the foil there are particles 2 which were cut open when the foil was sliced or stripped off the block and particles 3 which had a small part of their surface exposed in the process of stripping the foil off the block. FIG. 1 shows that a considerable part of the surface (herein termed an outer layer "x") of the foil is taken up by the cut and exposed metal particles 2 and 3.

The known process as revealed in French Pat specification No. 1,303,584, since it forms part of the disclosure of the present application, is given in detail in the following paragraphs having inwardly offset margins, said paragraphs constituting a translation into English of this French patent.

> Process of coating of a metal surface with a layer of charged polyetrafluor ethylene, and composite materials thus obtained for friction surfaces, such as those of bearings.
>
> It is known that the self-lubricating qualities of Polyetrafluor Ethylene, known under the trade name of "Teflon"—which will be used hereinafter—and its weak coefficient of friction form a material which is apparently ideal for friction surfaces, notably those of bearings.
>
> However, Teflon has, for such an application, two major drawbacks: On the one hand, it has bad thermal conductivity, which could give rise to increases in temperature that are too high for the gliding speed and for normal loads. For instance, temperatures are obtained in the order of 400° C. for a gliding speed of 1.50m/s, with a load of 1 kg./cm.$^2$. On the other hand, its creep aptitude is very high. For instance, size variations in the order of 30 percent are observed with application of the charge for a gliding speed of 2 m/s with a load of 10 kg./cm.$^2$.
>
> The present invention relates to a process for obtaining a composite material, formed by coating at least one side of a piece of metal with a layer of Teflon, which overcomes the above drawbacks, and its application for friction surfaces. In particular, very economical self-lubricating bearings are achieved with this material, for example for loads in the order of 5 kg./cm.$^2$. gliding speed in the order of 3m/s.
>
> The process covered by the invention consists of: obtaining by a known means a Teflon powder of a fixed homogeneous granulation; mixing with this Teflon powder a charge made up of a metallic material, good heat conductor, in powder form with the same homogeneous granulation as that of the Teflon powder; casting the mixture thus obtained into a block, using accepted casting methods; cutting a strip form this block preparing another metal surface by surface treatment such as sanding, causing microunevenness, then spreading a very fine layer of Teflon, evaporized without heating, on the prepared surface, maximum thickness of the layer being 2/100 of a mm. applying the strip of charged Teflon to the prepared metal surface using a pressure of 80 to 150kg./cm.$^2$; maintaining the whole under pressure at a temperature between 360° and 400° C. for a period of 4 to 12 hours, depending on the import of the metal piece; and then allowing to cool under pressure.
>
> The basic charge of the Teflon, made up of a metallic powder of homogeneous granulation, may be of copper, bronze, nickel stainless steel, aluminum, cast-iron, etc., these materials being present either alone or as alloys. This charge may also be completed by an addition of fiber glass to improve the behavior of the Teflon's molecular structure, and/or molybdenum bisulfide to improve the self-lubricating qualities; the composition of the charge is determined by the particular conditions of application of the composite material.
>
> The granulations of Teflon and its charge, which are homogeneous and equal, have for example a grain size of 30 microns.
>
> The thickness of the strip of charged Teflon, obtained by rolling off a leaf or by any other method, may be in the order of 5/10 of a mm.
>
> The following description will help to clarify the invention.
>
> The support mold contains a treated metallic strip spread with the Teflon grains, then the strip of charged Teflon and a thin strip of aluminum foil.
>
> The whole is then pressed, here by a piston, pressure being ensured by bolts firmly attached to a locking bar, which is connected to the support mold by screws.
>
> The aluminum foil is to prevent the piston from sticking to the Teflon strip.

The cylindrical bearing in the form of a ring, needs drilling to accommodate the bush of composite material, with its metallic strip and its strip of charged Teflon.

To make this bush, a composite strip, produced in accordance with the invention, is cut to prearranged size and form; it is then rolled and then fitted into the drilling of the bearing, the edges of the development joining the bush is machined to its final size by drilling and broaching. The final broaching is to press down the drilled surface of the bush to avoid the risk of size changes, drilling tools having the tendency to remove metal particles from the Teflon charge. A bearing in the form of a ring, needs a lining to accommodate the bush formed form the composite strip.

To make this bush, the composite strip is first calendered to press it down, then it is cut to size and form and fitted in the prepared lining in the bearing.

From this and from the type of synthetic resin used, difficulties arise in the way of secure bonding of the foil to the metal back.

According to the invention, the foil is therefore subjected on both surfaces to an etching treatment by means of which the cut and exposed metal granules 2 and 3 (FIG. 1) are dissolved out of the surfaces of the foil, leaving a thick central layer which is designated "b" and is termed the "base layer." This can be effected by means of alkali or acid, depending on the material of the granules 2, 3.

Figure 2:
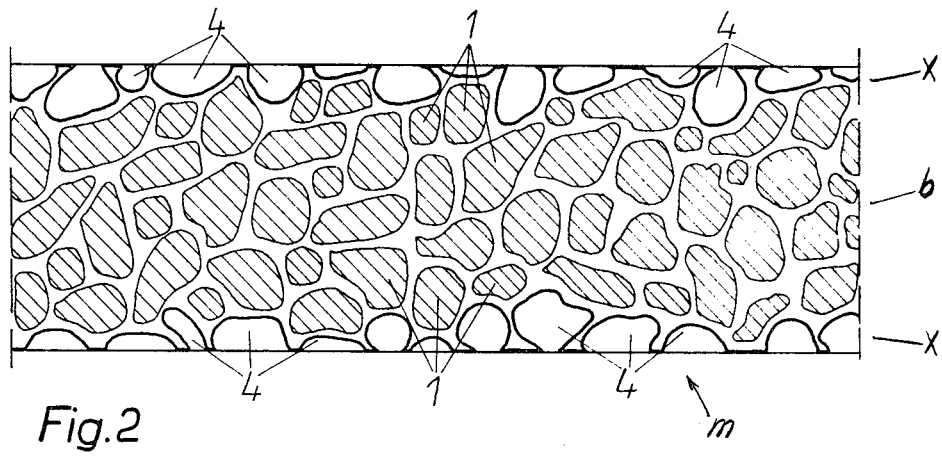
FIG. 2 is a view corresponding to that of FIG. 1, showing the foil after the etching process.

After this treatment, the foil surface has the structure indicated in FIG. 2. The surfaces or outer layers xof the foil are porous and have pits 4 where the cut and exposed metal particles 2 and 3 were previously situated.

Figure 3:
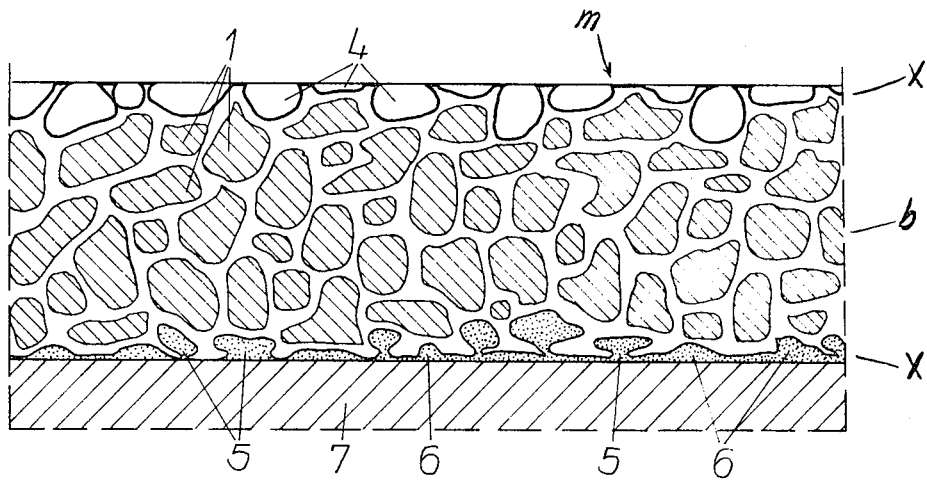
FIG. 3 is a view corresponding to FIGS. 1 and 2 of the foil after its application to the back of the bearing.

One surface of the foil which has been pretreated in this way is sprayed or coated with a dispersion of tetrafluorethylene which penetrates into the pits 4 with the result that the surface of the foil is capable of taking up a sufficient quantity of the dispersion 6 indicated by the dotted areas in FIG. 3 to ensure secure connection to the metal back member 7. The foil is then applied to the bearing back 7 under the action of heat and pressure. In doing this, the foil and the bearing back are at elevated temperatures, above ambient temperatures, when the foil is applied to the bearing back member. In this process, tetrafluorethylene is compressed in the region of the pits and becomes firmly connected to the back 7 of the bearing. The compression of the pitted surface of the foil is of special significance, firstly for the strength of the bond and anchoring of the adhesive in the surface of the foil and secondly on account of the fact that the metal granules 1 remaining in the foil are now again in the direct vicinity of the metal back 7 and thereby ensure satisfactory transfer of heat from the bearing layer to the bearing back 7.

I claim:

1. Process for the manufacture of slide bearings, which includes the steps of mixing powdered metal and powdered polytetrafluorethylene and compressing the same into a block wherein the polytetrafluorethylene intimately encloses the particles of powdered metal, cutting a foil form said block, dissolving powdered metal from a surface portion of one side of said foil to pit the surface portion, applying adhesive to said pitted surface and applying the foil to a bearing back plate with the pitted surface portion contacting the back plate, pressing said foil against the back plate so as to simultaneously compress the pitted surface portion, thereby to bond the foil to the back plate and bring undissolved powdered metal of the foil closer to said plate for the purpose of improving the transfer of heat therebetween.

2. The process of claim 1, wherein the foil is applied to the back plate under the action of heat and pressure.

3. The process of claim 2, wherein the foil and back plate are at elevated temperatures at the time that the foil is pressed against the back plate.

* * * * *